(12) United States Patent
Berme

(10) Patent No.: US 6,295,878 B1
(45) Date of Patent: Oct. 2, 2001

(54) PARTICULAR STRAIN GAGE ORIENTATION FOR A SIX COMPONENT LOAD MEASUREMENT DEVICE

(75) Inventor: Necip Berme, Worthington, OH (US)

(73) Assignee: Bertec Corporation, Worthington, OH (US)

( * ) Notice: Subject to any disclaimer, the term of this patent is extended or adjusted under 35 U.S.C. 154(b) by 0 days.

(21) Appl. No.: 09/459,329

(22) Filed: Dec. 13, 1999

(51) Int. Cl.$^7$ .................................................. G01L 7/00
(52) U.S. Cl. ............................................. 73/862.044
(58) Field of Search .................. 73/862.041, 862.042, 73/862.043, 862.044, 862.045, 862.046

(56) References Cited

U.S. PATENT DOCUMENTS

| | | |
|---|---|---|
| 3,591,924 | 7/1971 | Berg . |
| 3,693,425 * | 9/1972 | Starita et al. .................. 73/863.044 |
| 3,724,575 | 4/1973 | Kutsay . |
| 3,771,359 | 11/1973 | Shoberg . |
| 4,094,192 | 6/1978 | Watson et al. . |
| 4,487,078 * | 12/1984 | Schmitz ........................... 73/862.06 |
| 4,493,220 | 1/1985 | Carignan et al. . |
| 4,640,138 | 2/1987 | Meyer et al. . |
| 4,763,531 | 8/1988 | Dietrich et al. . |
| 5,313,828 | 5/1994 | Kotzle et al. . |
| 5,315,882 | 5/1994 | Meyer et al. . |
| 5,490,427 | 2/1996 | Yee et al. . |
| 5,889,214 * | 3/1999 | Kang et al. ..................... 73/862.044 |
| 5,894,094 * | 4/1999 | Kuchler et al. ........................ 73/146 |
| 5,930,741 | 7/1999 | Kramer . |
| 5,955,679 | 9/1999 | Leon . |
| 5,969,268 | 10/1999 | Sommerfeld et al. . |

* cited by examiner

Primary Examiner—Max Noori
(74) Attorney, Agent, or Firm—Francis T. Kremblas, Jr.

(57) ABSTRACT

Disclosed is a particular method of strain gage placement on a cylindrical or tubular device for measuring the three force and three moment components of a load. The prescribed parameters of this method optimize measurement sensitivity of the gages and simplify production. On any calibrated cylindrical or tubular device (e.g., a prosthetic or robotic arm), at least six strain gages shall be attached and wired independently or in an independent bridge configuration. A first set of at least three gages shall be oriented approximately sixty degrees or less from either side of the long axis of the device. Then, a second set of at least three gages shall be oriented between approximately forty-five and one hundred-twenty degrees to the first set of gages, and approximately no greater than sixty degrees from either side of the long axis of the device. Each respective gage shall be equally spaced from each other around the periphery of the device. A computer or other such calculation means shall be employed to determine the components and compensate for drift and noise.

2 Claims, 1 Drawing Sheet

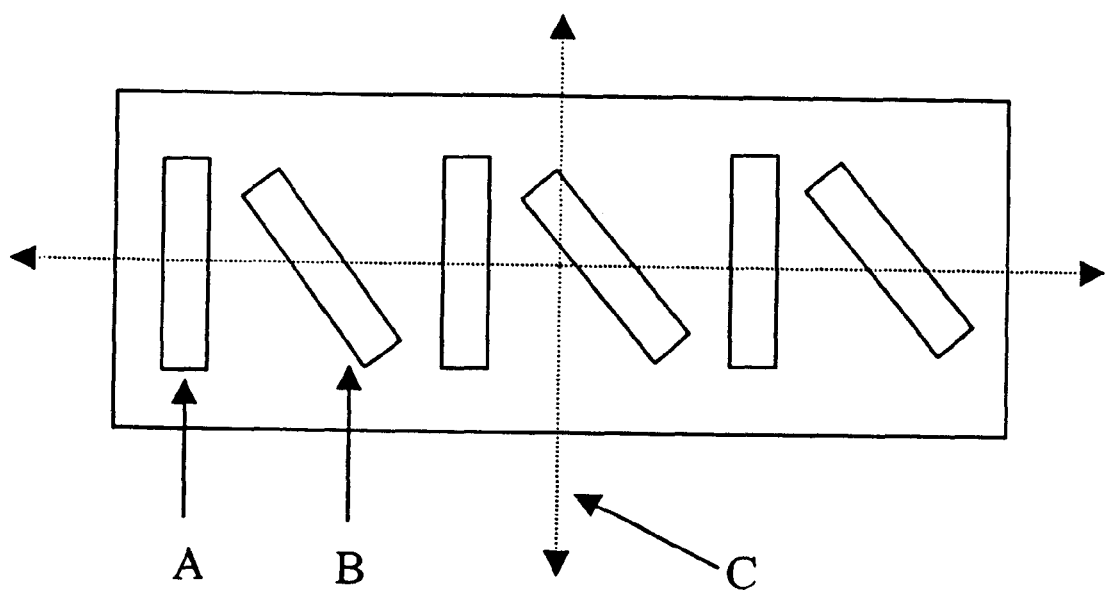

PARTICULAR STRAIN GAGE ORIENTATION FOR A SIX COMPONENT LOAD MEASUREMENT DEVICE

BACKGROUND OF THE INVENTION

A. Field of Invention

This invention relates to devices for measuring the three force and three moment components produced by applying a load to such a device; specifically, measurement devices utilizing strain gages and the placement and orientation of the strain gages on the measuring device.

B. Description of the Prior Art

Multi-component load transducers are typically designed by combining various flexure elements into one body, where each flexure element incorporates strain gages to measure a component of force or moment.

Alternatively, a cylindrical tubular design can be used where forces and moments are measured by gages specially positioned and oriented to isolate the individual load components to be measured. (Cunningham and Brown, 1952) (Smith, 1970). The traditional method of isolating the individual load components to be measured had the advantage where each output of the transducer corresponded to one of the force or moment components to be determined. Therefore, the conversion from measured electrical output signals to loads was a simple procedure.

Another approach measures the three force components transmitted through the neck of a hip prosthesis using three strain gages attached to the prosthesis with no specific orientation. (Bergmann, Journal of Biomechanics, 1988). It would appear from the literature that the strain gages are oriented and placed randomly. This results in a more complicated measurement conversion equation. Random orientation and placement has been used in multiple devices. The theory is that, as long as each gage measures a quantity independent from the others, random orientation and placement is possible. Unfortunately, random orientation and placement has the disadvantage that some channels may not have their optimum sensitivities.

After the advent of computers, difficult conversions as above are normally done by software. Thus, complicated conversion equations no longer pose a problem, yet the sensitivity problems remain.

The present invention eliminates the sensitivity disadvantages by positioning one set of strain gages in approximately a less than sixty degree orientation to the long axis of the cylindrical or tubular load cell, and another set of gages approximately between forty-five and one hundred-twenty degrees from the first set and approximately less than sixty degrees from the long axis of the cell. This configuration optimizes output sensitivities, and eliminates the need for precision placement of the gages. A computer or other calculation means shall be used to determine the components and compensate for drift and noise.

BRIEF SUMMARY OF THE INVENTION

The method of strain gage orientation and placement presently disclosed relates to the measurement of the three force and three moment components produced by applying a load to a cylindrical or tubular load cell. This method offers significant improvements over the prior art by prescribing the orientation and placement of strain gages on the measuring load cell. Such positioning increases and optimizes the sensitivity of the gages to the desired measurements. This configuration also eliminates the need for precise placement of the gages on the cell, thus adding to the device's usefulness by reducing the costs associated with manufacturing.

The measuring device is comprised of a cylindrical or tubular load cell with at least six strain gages attached to the cell. Alternatively, at least six strain gages can be placed in bridge configurations on the load cell. The strain gages are positioned approximately equally spaced from each other around the periphery of the load cell. Further, the individual gages are wired so that each gage is capable of independent measurement. Then, calculation means, such as a computer, are employed to determine the components of the load and compensate for drift and noise.

The preferred embodiment is comprised of a first set of at least three gages, where the gages are oriented so that they are approximately less than sixty degrees from either side of the long axis of the cylinder. Then, another set of at least three strain gages is oriented so that they are between approximately forty-five and one hundred-twenty degrees to the first set of gages, and approximately less than sixty degrees from either side of the long axis of the cylinder. Therefore, without precision positioning of the gages, and while overcoming the sensitivity problems of the prior art, all six force and moment components can be accurately measured.

Thus, the presently disclosed strain gage positioning method provides advantages, improvements, and usefulness not contemplated by the prior art.

BRIEF DESCRIPTION OF THE SEVERAL VIEWS OF THE DRAWINGS

FIG. 1 shows an exploded view of the cylindrical or tubular load cell with strain gages oriented and placed within the parameters of the specification.

FIG. 1 is for the Official Gazette.

DETAILED DESCRIPTION OF THE INVENTION

Presently disclosed is a method for measuring the three force and three moment components of a load. It is comprised of a cylindrical or tubular load cell (e.g. a prosthetic or robotic arm), at least six strain gages, wiring, and accompanying calculation means. The purpose of this disclosure is to show a strain gage configuration upon the load cell that overcomes the positioning and sensitivity needs of the prior art shown in the BACKGROUND section above.

In the preferred embodiment of the method FIG. 1, at least six strain gages are mounted on a cylindrical load cell in sets of at least three gages per set. The strain gages are equally spaced from each other and are positioned around the periphery of the cell. Then, the gages are oriented to the long axis of the cylinder and oriented to each other respectively.

The first set of at least three strain gages FIG. 1A, which are positioned approximately equally spaced from each other around the periphery of the load cell, is oriented approximately less than sixty degrees from either side of the long axis of the cylinder FIG. 1C. For example, FIG. 1A shows a strain gage positioned approximately parallel to the long axis. Such positioning, along the long axis of the cell FIG. 1C, is the preferred positioning to produce optimum sensitivity. However, positioning outside the less than sixty degree parameters of this disclosure will significantly degrade sensitivity. Another set of at least three strain gages FIG. 1B, which are positioned approximately equally spaced from each other around the periphery of the load cell, is oriented between approximately forty-five and one hundred-twenty degrees to the first set of gages FIG. 1A, and approximately less sixty degrees from either side of the long axis of the cylinder FIG. 1C. FIG. 1B shows the second set of gages optimally positioned at approximately forty-five degrees from the first set of gages FIG. 1A. Such forty-five degree positioning FIG. 1B is preferred to produce optimum sensitivity. However, positioning outside the one hundred-twenty degrees prescribed by this disclosure will significantly degrade sensitivity.

The positioning parameters disclosed simplify the production process because only approximate positioning is required; according to easily determined angles. Likewise, the sensitivity of the gages is maximized when they are placed within the disclosed parameters, thereby producing improved measurements. Therefore, without precision positioning of the gages, and while overcoming the positioning and sensitivity problems of the prior art, all three force and three moment components can be accurately measured.

The strain gages of the preferred embodiment shall be wired so that each gage is capable of independent measurement. Alternatively, other embodiments and versions may be wired in six independent bridge configurations.

In all embodiments and versions, calculation means, such as computers, shall be used to determine the components and compensate for drift and noise.

The presently disclosed method does not require strain gage placement on a specific kind of cylindrical or tubular load cell. However, other embodiments and versions shall continue to adhere to the above positioning parameters. The following is a nonexclusive listing of applications, embodiments, and versions.

Applied medically, these versions would position the gages as prescribed on cylindrical shaped prosthetics to measure the efficacy and loading on the prosthetic device. Alternatively, when used commercially or industrially, the disclosed gage positioning parameters allow for force and moment measurements to be taken accurately; either in the field or on-site. For example, a construction or production crew can attach the required number of gages to a machine, table, or any calibrated cylindrical object to determine the forces and moments the activity or load is exerting on that object.

Thus, the presently disclosed strain gage positioning method provides advantages, improvements, and usefulness not contemplated by the prior art.

I claim:

1. A cylindrical load cell having a longitudinal axis and capable of measuring six load components, comprising a) at least two sets of strain gages, each set having at least three strain gages attached to said load cell;

b) said at least three strain gages in one set of strain gages being approximately equally spaced from one another about the periphery of said load cell and oriented between approximately zero to sixty degrees relative to either side of the longitudinal axis of said cylindrical load cell;

c) said at least three strain gages of a different set of strain gages being approximately equally spaced from one another about the periphery of said load cell and oriented between approximately forty-five to one hundred and twenty degrees from the at least three strain gages of the set of strain gages defined in paragraph (b) and between zero to sixty degrees relative to either side of the longitudinal axis of said cylindrical load cell;

d) each of said strain gages in said at least two sets being wired to make an independent measurement operatively communicated to a computer processor to calculate the load components and compensate for drift and noise.

2. A cylindrical load cell having a longitudinal axis and capable of measuring six load components, comprising a) at least two sets of strain gages, each set having at least three strain gages attached to said load cell;

b) said at least three strain gages in one set of strain gages being approximately equally spaced from one another about the periphery of said load cell and oriented between approximately zero to sixty degrees relative to either side of the longitudinal axis of said cylindrical load cell;

c) said at least three strain gages of a different set of strain gages being approximately equally spaced from one another about the periphery of said load cell and oriented between approximately forty-five to one hundred and twenty degrees from the at least three strain gages of the set of strain gages defined in paragraph (b) and between zero to sixty degrees relative to either side of the longitudinal axis of said cylindrical load cell;

d) each one of said strain gages in said at least two sets being operatively connected to a different Wheatstone bridge configuration independently from one another to make an independent measurement operatively communicated to a computer processor to calculate the load components and compensate for drift and noise.

* * * * *